Feb. 21, 1933. M. L. FOX 1,898,622
SHOCK ABSORBER
Filed April 9, 1931  2 Sheets-Sheet 1
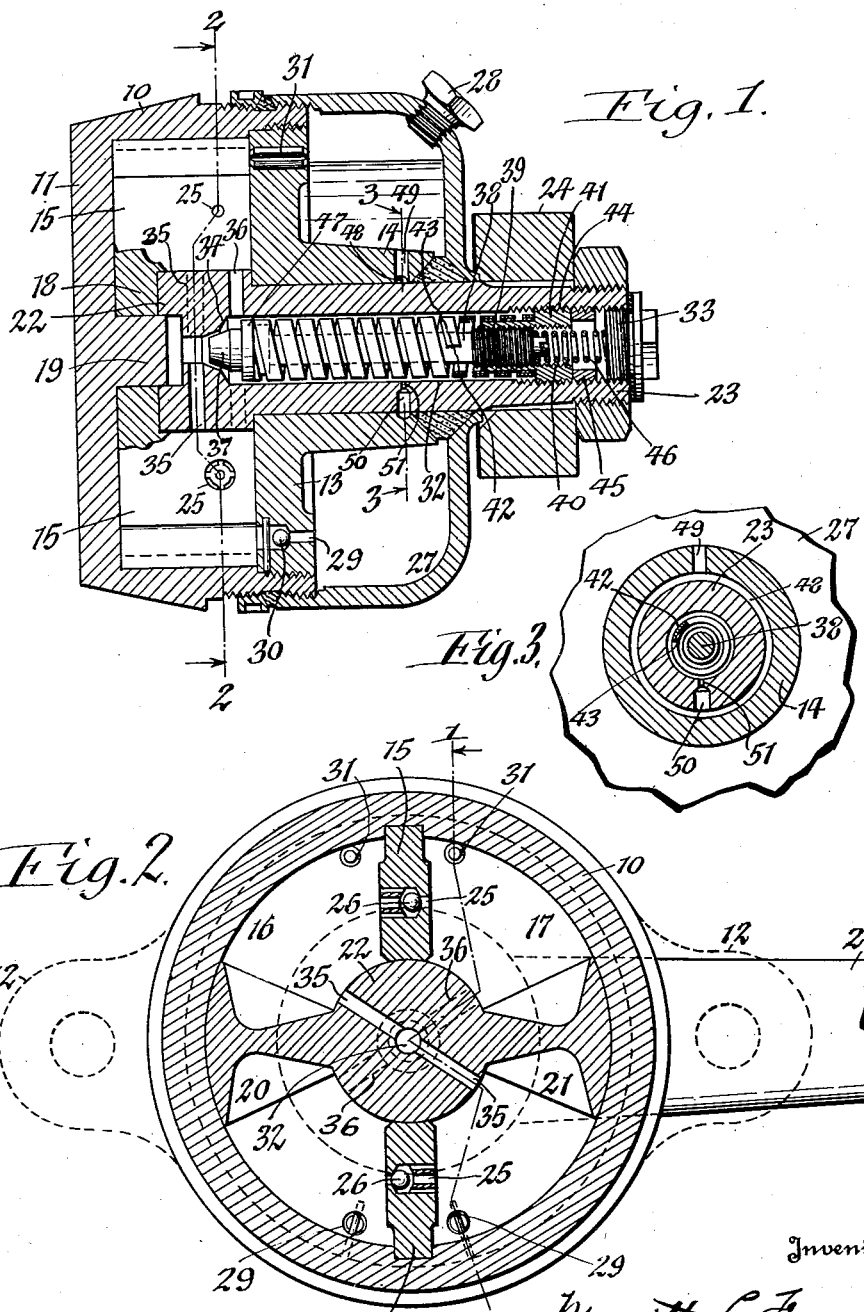

Feb. 21, 1933.   M. L. FOX   1,898,622
SHOCK ABSORBER
Filed April 9, 1931   2 Sheets-Sheet 2
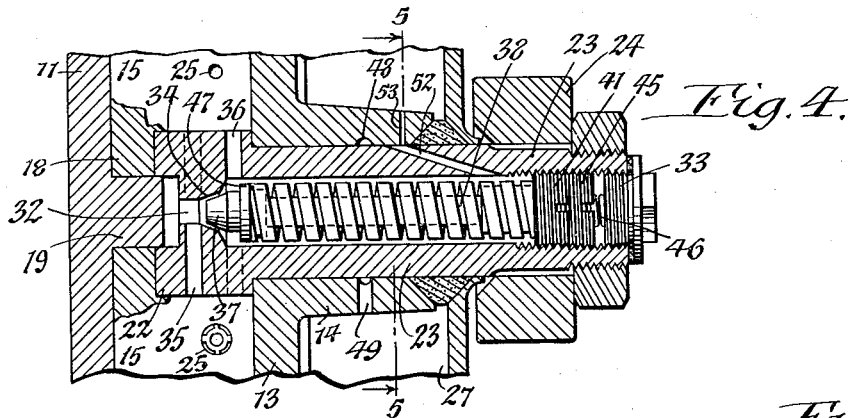
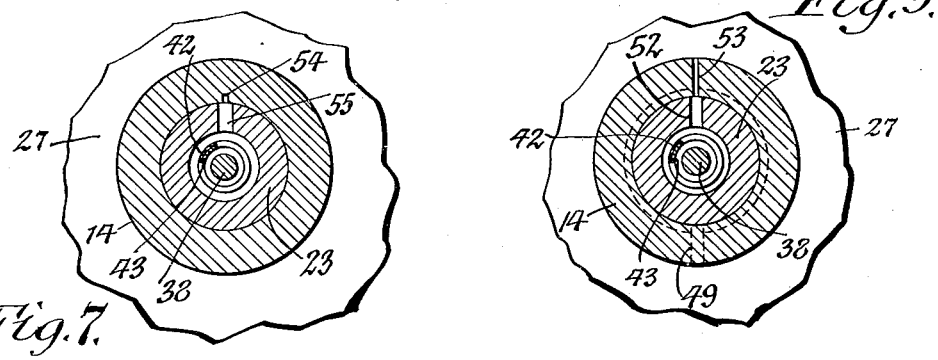
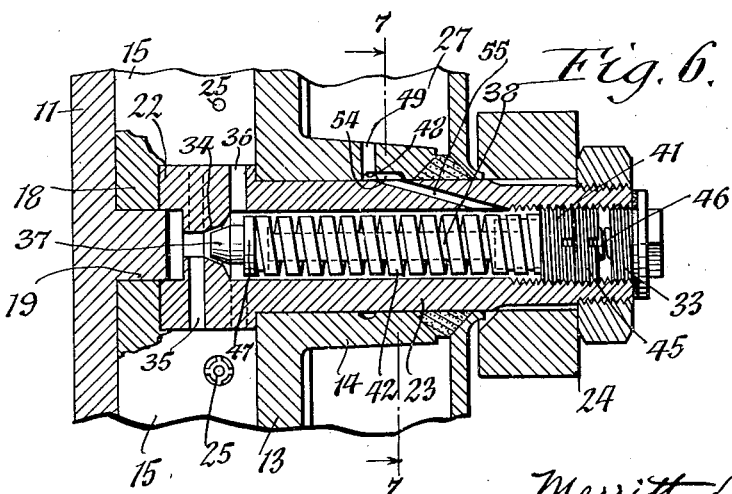
Inventor
Merritt L. Fox
By Popp & Powers
Attorneys Patented Feb. 21, 1933

1,898,622

UNITED STATES PATENT OFFICE

MERRITT L. FOX, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed April 9, 1931. Serial No. 528,773.

This invention relates to a hydraulic shock absorber and more particularly to an absorber of this character having automatic means for varying the freedom of flow of the resistance liquid in accordance with changes in the temperature to which the instrument is exposed.

In the operation of this type of shock absorber the temperature of the resistance liquid is not only affected by the normal temperature of the external atmosphere to which the instrument is exposed but also by the working temperature of the resistance liquid as the latter is forced back and forth in the working chambers during the operation of the instrument.

It has been found from experience that when the thermostatic element which is responsive to temperature changes and operates the liquid controlling valve is not exposed to a portion of the resistance liquid which interchanges with the liquid in the working chamber that the thermostatic element will not accurately respond to the temperature changes and may, for example, in some installations maintain the resistance liquid immersing the thermostatic element in a comparatively cold condition during cold weather, while the temperature of the liquid in the working chambers is higher and thus causes the colder liquid surrounding the thermostatic element to effect an opening movement of the controlling valve instead of a closing movement of the same to permit lesser flow of the liquid as the same becomes thinner in the working chamber due to energy absorption.

The object of this invention is to so organize the thermostatic valve means of a hydraulic shock absorber that the same will be subject to the working temperature of the instrument and cause the controlling valve to be increasingly closed as the resistance liquid becomes thinner due to absorption of work while in operation, and thereby ensure uniform operation of the absorber under different temperature conditions.

In the accompanying drawings:

Fig. 1 is a vertical longitudinal section of a shock absorber of the "Houdaille" type equipped with one form of my invention.

Figs. 2 and 3 are vertical cross sections of the same taken on the correspondingly numbered lines in Fig. 1.

Fig. 4 is a fragmentary longitudinal section of a similar shock absorber showing a modified form of this improvement.

Fig. 5 is a cross section taken on line 5—5, Fig. 4.

Fig. 6 is a fragmentary longitudinal section showing another form of this improvement.

Fig. 7 is a cross section taken on the correspondingly numbered line in Fig. 6.

In the following description similar characters of reference indicate like parts in the several figures of the drawings.

Although this improvement may be embodied in hydraulic shock absorbers of various forms, that shown in Figs. 1, 2 and 3 of the drawings, as an example, has its body composed of a cylindrical side wall 10, a rear wall 11 arranged at the rear end of said cylindrical wall and provided with laterally projecting lugs 12 for attaching the same to the frame of an automobile or other part which is one movable relatively to another, and a front wall 13 arranged at the front end of the cylindrical wall and provided with a forwardly projecting tubular bearing 14. The space within the body is divided by two diametrically opposite partition sections 15, 15 into two semi-cylindrical working chambers 16, 17 which contain resistance liquid such as oil, glycerine or the like for cushioning or absorbing the shock to which the automobile is subjected. These partition sections are connected adjacent to their ends by a centering or pilot collar 18 which receives a centering or pilot pin 19 on the rear wall of the casing or body of the absorber.

Within the working chambers are arranged two pistons 20, 21 which are oscillated therein when the two parts between which the shock absorber is interposed move toward and from one another. These pistons are connected at their inner ends by a hub 22 which engages with the inner edges of the partition sections 15, 15, and is arranged at the rear end of an operating shaft 23 which extends forwardly through the tubular bearing 14 and is journaled therein. At its front end this shaft is provided with a rock arm or operating lever 24 which is attached to another part movable relatively to the automobile frame such as an axle which is connected by springs with the frame and carries supporting wheels.

During the movement of the axle toward the frame only a moderate cushioning effect is exerted by the absorber inasmuch as during this time the resistance liquid is permitted to pass with comparative freedom from the low pressure end of each working chamber to the high pressure end of the other working chamber through ports 25 in the partition sections being opened by check valves 26 but during rebound of the frame and axle away from each other the check valves 26 close so that the resistance liquid is prevented from escaping freely therefrom and thus cushions the shock to which the car may be subjected.

Replenishing of the resistance liquid to the working chambers is effected from a replenishing chamber 27 which is arranged in front of the working chambers and around the tubular bearing in which the operating shaft is journaled. This replenishing chamber is filled through an opening in its top which is normally closed by a plug 28 and liquid is delivered from the lower end of the same to the lower ends of the working chambers through one or two replenishing ports 29 arranged in the lower part of the front wall and containing check valves 30 which open toward the working chamber but close toward the replenishing chamber. Air in the working chamber is permitted to pass from the upper ends of the same to the upper end of the replenishing chamber through one or two vents 31 formed in the upper part of the front wall.

Formed axially in the piston hub and the operating shaft is a longitudinal valve chamber 32 which is normally closed at its front end by a screw plug 33.

Adjacent to its rear end the valve chamber is provided with a forwardly facing valve seat or port 34 and in rear of this seat the valve chamber is connected with the low pressure ends of the working chambers by high pressure controlling conduits or passages 35 formed radially in the hub and extending to the periphery of the same and in front of this valve seat the valve chamber is connected with the low pressure ends of the working chambers by low pressure controlling conduits or passages 36 arranged in the hub in front of the port or seat 34 and extending radially from the bore of the valve chamber to the periphery of the same. The cross sectional area of the controlling or regulating conduit formed by the port 34 and the passages 35 and 36 is adjusted for metering or relieving the resistance which the liquid in the working chambers offers to the movement of the pistons therein and is regulated to suit different installations and the character of the liquid employed by the use of a metering or regulating valve 37 which is adjustable both manually and automatically. The manual adjustment is effected by means of a valve stem 38 arranged lengthwise in the valve chamber and connected at its rear end with the regulating valve 37 while its front end is provided with an external screw thread 39 which works in an internal screw thread 40 formed in an adjusting sleeve 41 having an external screw connection 44 with the front part of the bore of the operating shaft. By turning the sleeve 41 in one direction or the other the valve stem 38 and the valve 37 are moved lengthwise toward or from the regulating port 34, thus varying the effective area of this port accordingly and permitting the resistance liquid to flow back and forth between the opposite ends of the working chambers to suit the character of the liquid, the particular load imposed on the absorber and other conditions required in any particular installation. This adjustment is effected by applying a tool or wrench of any suitable character to the adjusting sleeve 41 which is accessible from the exterior of the absorber upon removing the screw plug 33. After this screw sleeve has been adjusted the same is held against displacement by a jamb nut 45 engaging the internally threaded front part of the valve chamber and engaging the front end of said sleeve, as shown in Fig. 1.

Automatic adjustment of the regulating valve 37 in response to temperature changes is effected by a helical thermostat element composed of two overlying helical strips of metal having different co-efficients of expansion, such for example as an outer strip or layer 42 of bronze or brass and an inner strip or layer 43 of ordinary iron or invar iron which strips are united so that the same are practically integral. The rear end of this bi-metallic thermostatic member is connected with the valve stem 38 and the front end of the same is connected with the adjusting sleeve 41. When the temperature affecting the thermostatic element is lowered the coils of this element 42, 43 contract helically thereby causing the same to turn the valve stem forwardly and carry the regulating valve 37 away from the port 34 and thus permit the resistance liquid which becomes thicker when cool to flow more freely from one end of each working chamber to the other through the port 34 and the passages 35, 36. A rise in the temperature to which said element 42, 43 is exposed will cause the latter to expand helically and carry the regulating valve 37 nearer to the regulating port 34 and thereby restrict the flow of the resistance liquid which becomes thinner when warm. The liquid resistance of the shock absorber is thus automatically regulated so as to cause the absorber to work uniformly under varying temperature conditions. The longitudinal movement of the regulating valve and its stem at this time is due to the forward and backward rotation of these parts under the action of the helical temperature responsive element 42, 43 which rotary motion causes the valve stem 39 to screw forwardly or backwardly in the sleeve 41 which serves as an abutment or anchor for this purpose. During the longitudinal movement of the regulating valve and its stem this valve is guided and maintained in a centered position relative to the regulating port 34 by a guide collar 47 arranged on this valve stem immediately in front of this valve 37 and movably engaging the adjacent part of the bore of the valve chamber. The screw joint between the valve stem and the adjusting sleeve 41 is made comparatively loose so as to enable this stem to turn freely under the action of the thermal element 42, 43 but the regulating valve is yieldingly held in its rearmost position by a spring 46 arranged in the front part of the valve chamber and interposed between the front end of the valve stem and the rear side of the screw plug 33.

During the operation of the instrument the pressure which is exerted against the resistance liquid causes some of this liquid to be forced forwardly through the joint or cooperating bearing surface on the periphery of the operating shaft 38 and the bore of the tubular bearing 14 which liquid is caught in an annular intercepting groove 48 formed in the bore of the bearing 14 around the operating shaft and is conducted from this groove back into the replenishing chamber by a radial passage or duct 49 extending from the groove 48 to the periphery of the bearing 14, as shown in Figs. 1 and 3, so that this liquid can be again fed to the working chambers instead of escaping to the exterior of the instrument and being wasted.

It has been found by experience that in extremely cold weather and particularly when the shock absorber is so mounted on the car that it is exposed to cold blasts, the conduction of the low temperature through the exposed operating lever, replenishing chamber and operating shaft to the interior of the instrument is such as will cause the small body of resistance liquid which surrounds the thermal element 42, 43 to remain cold and cease to function for closing the regulating valve 37 as the temperature of the liquid in the working chambers is increased due to the normal operation of the apparatus, thereby causing improper action of the same while in use.

To insure functioning of the automatically controlled valve 37 and cause the same to be opened and closed as the fluidity of the resistance liquid in the working chambers and replenishing chamber changes in response to temperature changes the shock absorber is so organized that the liquid in which the thermostat member is immersed will be influenced by the liquid in the working chamber and thus maintain the liquid in the valve chamber, at the required temperature for proper working of the instrument. The means for accomplishing this purpose, shown in Figs. 1 and 3, consist of a bleeder hole, conduit or passage extending from the bore of the valve chamber 32 about midway of its length to the periphery of the operating shaft in line with the intercepting groove 48 which bleeder hole comprises a comparatively large outer part 50 opening into the groove 48 and a small inner part 51 extending from the bottom of the large part to the bore of the valve chamber.

By this means a constant small flow of heated resistance fluid passes the thermostatic element, thus replacing the heat which has been dissipated by the cooling action of the surrounding atmosphere and causes the regulating valve to be automatically adjusted in accordance with the correct temperature conditions. Moreover, an additional definite advantage is gained by this organization due to the constant circulation of warm oil or resistance liquid in that the entire radiating portion of the instrument is heated from within at approximately the same temperature, which results in the oil or liquid temperature in the working chamber being relatively lower than was found to be the case before this bleeder hole was provided.

By making the outer part 50 of the bleeder hole large and the inner part 51 thereof small this circulation of the resistance liquid can be effected without exhausting more liquid from the working chambers than can be supplied thereto by the replenishing chamber through the replenishing ports, otherwise a void would be produced in the instrument and the same would fail to function continuously through complete cycles of operations. The formation of the bleeder hole in this manner can be effected very easily and economically by ordinary drilling operations without the need of special tools.

If desired the bleeder hole may be formed in the manner shown in Figs. 4 and 5 where the same consists of a large inner part 52 arranged diagonally in the operating shaft between the hub 22 and the intercepting groove 48 and extending from the bore of the valve chamber 32 to the periphery of the operating shaft and a small outer part 53 formed in the bearing 14 and extending from the bore thereof in line with the inner part 52 to the periphery of the bearing 14 within the replenishing chamber.

Instead of the construction of bleeder hole shown in Figs. 1–5, that shown in Figs. 6 and 7 may be employed which consists of a large inner part 55 formed in the operating shaft 23 between the hub 22 and the intercepting groove 48 and extending from the bore of the operating shaft to the periphery thereof, and a small outer part 54 having the form of a groove arranged lengthwise in the bore of the bearing 14 and extending from the outer end of the large inner part 55 to the intercepting groove 48.

In the forms of the bleeder holes shown in Figs. 4–7 a large flow of resistance liquid is permitted but this only occurs when the large inner part of the bleeder hole in the operating shaft registers with the small outer part of this hole in the bearing 14 which is only of short duration. This form of bleeder hole therefore provides a pulsating flow of warm resistance oil and accomplished the same purpose as the construction shown in Figs. 1–3 but is advantageous in that it permits of using more commercial sizes of tools in its manufacture.

I claim as my invention:

1. A hydraulic shock absorber comprising a working chamber adapted to contain a resistance liquid, a replenishing chamber adapted to contain a reserve supply of resistance liquid for use in said working chamber, a wall between said working and replenishing chambers and having a bearing, a piston oscillating in said working chamber and having a hub, an operating shaft rocking in said bearing and connected with said piston, said hub and shaft being provided with an axial valve chamber, said hub being provided with controlling passages leading from said valve chamber to said working chamber on opposite sides of said piston and a port between said passages, a controlling valve arranged in said valve chamber and adapted to move relatively to said port, a thermostatic element arranged in said valve chamber and operatively associated with said valve for moving the same in response to variations in temperature, a liquid passage extending from the bore of said valve chamber to the periphery thereof, and a liquid passage extending from the bore of said bearing to said replenishing chamber, said passages being adapted to come into and out of communication during relative movement of said shaft and bearing.

2. A hydraulic shock absorber comprising a working chamber adapted to contain a resistance liquid, a replenishing chamber adapted to contain a reserve supply of resistance liquid for use in said working chamber, a wall between said working and replenishing chambers and having a bearing, a piston oscillating in said working chamber and having a hub, an operating shaft rocking in said bearing and connected with said piston, said hub and shaft being provided with an axial valve chamber, said hub being provided with controlling passages leading from said valve chamber to said working chamber on opposite sides of said piston and a port between said passages, a controlling valve arranged in said valve chamber and adapted to move relatively to said port, a thermostatic element arranged in said valve chamber and operatively associated with said valve for moving the same in response to variations in temperature, an outer liquid pass extending from the bore of said bearing to the periphery thereof and into said replenishing chamber, and an inner liquid passage formed in said shaft and extending from the bore of said valve chamber to the periphery thereof and adapted to move into and out of communication with said outer passage during the rocking movement of said shaft.

3. A hydraulic shock absorber comprising a working chamber adapted to contain a resistance liquid, a replenishing chamber adapted to contain a reserve supply of resistance liquid for use in said working chamber, a wall between said working and replenishing chambers and having a bearing, a piston oscillating in said working chamber and having a hub, an operating shaft rocking in said bearing and connected with said piston, said hub and shaft being provided with an axial valve chamber, said hub being provided with controlling passages leading from said valve chamber to said working chamber on opposite sides of said piston and a port between said passages, a controlling valve arranged in said valve chamber and adapted to move relatively to said port, a thermostatic element arranged in said valve chamber and operatively associated with said valve for moving the same in response to variations in temperature, an annular liquid groove formed in the bore of said bearing and having a passage leading to the periphery thereof, an outer radial liquid passage formed in said bearing between said groove and said hub and extending from the bore of said bearing to the periphery thereof and into said replenishing chamber, and an inner liquid passage formed in said shaft and extending from the bore of the valve chamber to the periphery of said shaft and adapted to move into and out of communication with said outer radial passage during the rocking movement of said shaft.

4. A hydraulic shock absorber comprising a working chamber adapted to contain a resistance liquid, a replenishing chamber adapted to contain a reserve supply of resistance liquid for use in said working chamber, a wall between said working and replenishing chambers and having a bearing, a piston oscillating in said working chamber and having a hub, an operating shaft rocking in said bearing and connected with said piston, said hub and shaft being provided with an axial valve chamber, said hub being provided with controlling passages leading from said valve chamber to said working chamber on opposite sides of said piston and a port between said passages, a controlling valve arranged in said valve chamber and adapted to move relatively to said port, a thermostatic element arranged in said valve chamber and operatively associated with said valve for moving the same in response to variations in temperature, means affording passageway through said shaft and bearing for flow of fluid from said valve chamber to said replenishing chamber, and means whereby said passageway is interrupted during part of the relative oscillation of said shaft and bearing.

5. A hydraulic shock absorber comprising a working chamber adapted to contain a resistance liquid, a replenishing chamber adapted to contain a reserve supply of resistance liquid for use in said working chamber, a wall between said working and replenishing chambers and having a bearing, a piston oscillating in said working chamber and having a hub, an operating shaft rocking in said bearing and connected with said piston, said hub and shaft being provided with an axial valve chamber, said hub being provided with controlling passages leading from said valve chamber to said working chamber on opposite sides of said piston and a port between said passages, a valve arranged in said valve chamber and adapted to move relatively to said port, a thermosatic element extending through said valve chamber and operatively associated with said valve for moving the same in response to variations in temperature, means affording a passageway through said shaft and bearing for flow of fluid from the outer end of said valve chamber to said replenishing chamber, and means whereby said passageway is interrupted during part of each relative oscillation movement of said shaft and bearing.

In testimony whereof I hereby affix my signature.

MERRITT L. FOX.